(12) United States Patent
Stafie et al.

(10) Patent No.: US 7,962,636 B2
(45) Date of Patent: *Jun. 14, 2011

(54) USING A VARIABLE IDENTITY PIPE FOR CONSTRAINED DELEGATION AND CONNECTION POOLING

(75) Inventors: Iulian Catalin Stafie, Redmond, WA (US); Narasimhan Sundararajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,061

(22) Filed: Aug. 24, 2010

(65) Prior Publication Data

US 2010/0318604 A1 Dec. 16, 2010

Related U.S. Application Data

(63) Continuation of application No. 11/169,529, filed on Jun. 29, 2005, now Pat. No. 7,805,527.

(51) Int. Cl.
*G06F 15/16* (2006.01)
(52) U.S. Cl. ........ 709/229; 709/202; 709/203; 709/220; 709/221; 709/227
(58) Field of Classification Search ............. 709/203, 709/229, 202, 220, 221, 227
See application file for complete search history.

(56) References Cited

U.S. PATENT DOCUMENTS

| | | | |
|---|---|---|---|
| 2003/0041146 A1* | 2/2003 | Davis et al. | 709/227 |
| 2003/0177388 A1* | 9/2003 | Botz et al. | 713/201 |
| 2004/0210756 A1* | 10/2004 | Mowers et al. | 713/168 |

OTHER PUBLICATIONS

Oracle, Inc. "Oracle Database Security Guide." 10G Release 1 No. B10773-01. Dec. 2003, pp. 1-424, available at http://download-west.oracle.com/docs/cd/B14117_01/network.101/b10773.pdf.*

* cited by examiner

*Primary Examiner* — Larry Donaghue
*Assistant Examiner* — Nicholas Taylor
(74) *Attorney, Agent, or Firm* — Workman Nydegger

(57) ABSTRACT

Example embodiments provide for a system configured to provide constrained delegation and connection pooling for a back-end server by providing a variable identity pipe between it and a front-end server. A client will authenticate to the front-end process using credentials that are typically non-delegable by default, e.g., a token, certificate, or the like. The front-end is configured to extract client identity information and use this information to request changing an identity associated with the variable identity pipe. In addition, requests for actions on resources received from the client can be transformed into remote procedural calls and used by the back-end server to process the requests. A response is sent back over the variable identity pipe to the client via the front-end server. The variable identity pipe is left open to allow other requests from other clients to be sent over the variable identity pipe in a similar manner.

7 Claims, 3 Drawing Sheets

USING A VARIABLE IDENTITY PIPE FOR CONSTRAINED DELEGATION AND CONNECTION POOLING

CROSS-REFERENCE TO RELATED APPLICATIONS

This application is a continuation of U.S. patent application Ser. No. 11/169,529 (filed Jun. 29, 2005) entitled "USING A VARIABLE IDENTITY PIPE FOR CONSTRAINED DELEGATION AND CONNECTION POOLING" which is hereby included by reference in its entirety.

BACKGROUND

Computerized systems provide many advantages towards peoples' ability to perform tasks. Indeed, the computer system's ability to processes information has transformed the way we live and work. Computer systems now commonly perform a host of tasks (e.g., word processing, scheduling, database management, etc.) that prior to the advent of computer systems where preformed manually. Further, computing systems have been coupled together to form computer networks over which the computer systems can communicate electronically to share data. As a result, many of the tasks preformed at a computer system (e.g., accessing electronic mail, web browsing, etc.) include electronic communication with one or more other systems via a computer network (e.g., the Internet).

Often, electronic communication on a computer network includes a client computer system (hereinafter referred to as a "client" or "user") requesting access to a service (e.g., electronic mail, web service accounts, etc.) at a server computing system (hereinafter referred to as a "server" or "service"). Before allowing the client access to the service, the server will typically issue a challenge to the client requiring the client to prove its identity. Accordingly, the user will respond providing the service with the user credentials, e.g., a token, certificate, username and password, etc. Once authenticated, the user is given authorization, which allows the user to perform actions (e.g., delete, created, move, modify, etc.) on various resources (e.g., folders, messages, processes, etc.) based on privileges associated with the user's account. When the client is through communicating with the server, the connection is severed.

The above described buildup and tear down of communication channels between a client and a server is a very costly process. Accordingly, a high volume of client connections can severely slow or even shutdown processes on the server. In order to reduce some of the processing burdens of such servers, newer topologies are emerging that utilize front-end and back-end servers. These topologies use front-end servers to provide a lot of the functionality for processing services, while back-end servers are used mostly to store the data corresponding to the resources. As such, the front-end services acts as a load balancing device for the back-end providing functionality that was previously only performed by a single server. In other words, there can be several front-end services acting on behalf of a host of clients, yet only a single back-end is used to access resources for all of the clients. Note, however, that a client must now authenticate themselves to both servers in order to gain access to each one.

For credentials that are delegable by default, (e.g., username and password) the above topology does not pose a significant problem since the front-end server can use such credentials to impersonate the client to the back-end. Non-delegable credentials (e.g., operating system tokens, digital certificates, and the like), on the other hand, have created some problems for such topologies. In an attempt to rectify this and other deficiencies, some systems provide for a general delegation that allows the client to authenticate using a certificate at one server and then allow access to all other servers within the network or enterprise. As can be seen, however, this poses a high security risk and has some of the same shortcomings of providing delegable credentials, i.e., it allows full access to the network.

To combat the concerns of general delegation, another mechanism called constrained delegation has been created. In this infrastructure, delegation is limited to a predefined set of servers within the network. Although this is a great improvement over general delegation systems, constrained delegation topologies also have their shortcomings. For example, these infrastructures are very complex and require a high degree of skill to appropriately configure. Further, many systems require use of the same versioning of software and/or hardware for each of the servers within the network. Commonly, however, systems have mixed configurations and thus will not be able to use constrained delegation. In addition, constrained delegation requires a two-way trust between the delegable servers. Accordingly, resource forests with only one-way trust cannot take advantage of this feature.

Nevertheless, even if constrained delegation or general delegation where used, similar latency problems as previously discussed arise for these topologies as well. In particular, connections from the front-end to the back-end require a fixed identity pipe for the communications. Accordingly, each client requesting access to resources on the back-end must be given a communication channel with the same costly buildup and tear down procedures described above.

SUMMARY

The above-identified deficiencies and drawbacks of systems that use multiple servers for load balancing purposes are overcome through exemplary embodiments of the present invention. Please note that the summary is provided to introduce a selection of concepts in a simplified form that are further described below in the detailed description. This summary, however, is not intended to identify key or essential features of the claimed subject matter, nor is it intended to be used as an aid determining the scope of the claimed subject matter.

In one embodiment, methods, systems, and computer program products are available for providing constrained delegation while reducing connections needed for a multitude of clients to take actions on resources residing on a back-end server by using a single variable identity communication channel between the back-end server and a front-end server. First, a request to establish a variable identity pipe used in facilitating communications between multiple clients and a back-end server is sent. Thereafter, a first request is received from a first client to take one or more actions on one or more resources on the back-end server corresponding to an account for the first client. Accordingly, one or more first remote procedure calls are sent over the established variable identity pipe on behalf of the first client. Note that the one or more remote procedure calls are used to invoke the one or more actions or the one or more resources corresponding to the account for the first client. Next, a second request is received from a second client to take one or more actions on one or more resources on the back-end server corresponding to an account for the second client. As such, one or more second remote procedure calls are sent over the established variable identity pipe on behalf of second client. Also note that the one or more second remote procedure calls are used to invoke the one or more actions on the one or more resources corresponding to the account of the second client.

In an another embodiment methods, systems, and computer program products are provided for pooling connections for a back-end server by changing identity for an established communication channel in order to reduce the number of connections needed to allow multiple clients to take action on resources residing on the back-end server. A request to establish a variable identity pipe with a front-end server is received. The request includes a front-end identifier for authenticating the front-end to a back-end server. Upon authenticating the front-end server, the variable identity pipe is established by associating the front-end identifier with the variable identity pipe, which is used to facilitate communications between multiple clients and the back-end server. Thereafter, a request is received from the front-end server to change the front-end identity associate with the variable identity pipe to a first client identity, wherein the request includes information about the first client identity. In response to the request, the front-end identity associated with the variable identity pipe is changed to first client identity. This allows the first client to make requests via the front-end server to take actions on resources residing on the back-end server that correspond to an account for the first client.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
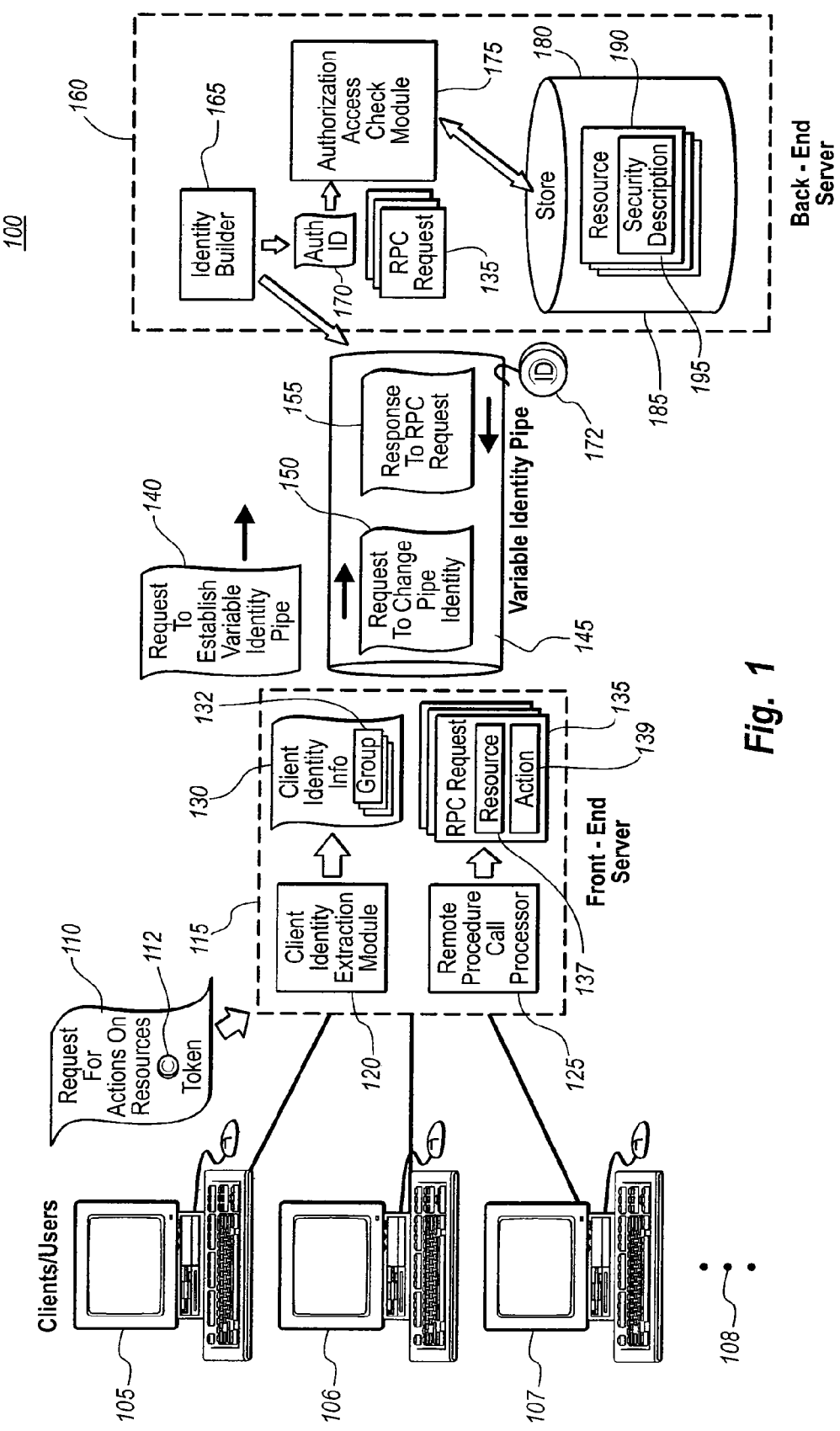
FIG. 1 illustrates a distributed system configured to establish a variable identity pipe between two servers in accordance with example embodiments.

The present invention extends to methods, systems, and computer program products for using and changing an identity of a variable identity pipe in order to reduce the number of connections needed for facilitating communications between a multitude of clients and a back-end server. The embodiments of the present invention may comprise a special purpose or general-purpose computer including various computer hardware or modules, as discussed in greater detail below.

Exemplary embodiments provide for a distributed system that is configured to provide constrained delegation and pool connections for a back-end server by providing a variable identity pipe or communication channel between the front-end process and the back-end server. (Note that the terms "connection", "pipe", and "communication channel" are used herein interchangeably). A client will authenticate to a front-end process using credentials that are typically non-delegable by default, e.g., a token, certificate, or the like. Upon authenticating the client, the front-end is configured to extract client identity information (e.g., those groups to which the client corresponds to) from the credentials. This information is then used to change the identity associated with the variable identity pipe. In addition, requests for actions on resources received from the client can be transformed into remote procedural calls to be used by a back-end server to process the requests.

After establishing the variable identity pipe, the front-end server sends the extracted client identity information and remote procedure calls in a request to change the pipe identity. The client identity information is used to associate a new identity with variable identity pipe and is also used to authorize the actions on the resource. A response is then sent back over the variable identity pipe to the client via the front-end server. The variable identity pipe is left open such that as other requests from other client are received at the front-end, the identity of the variable identity pipe can be changed in order to process such requests on a back-end server as previously described.

Note that the embodiments herein for allowing connection pooling increases the scalability and performance of the over all system. Further, constrained delegation is provided without the difficulty in configuration and other topology restraints, while still reducing the number of fixed identity connections created and torn down for communicating requests to a back-end server.

Prior to describing further details for various embodiments of the present invention, a suitable computing architecture that may be used to implement the principles of the present invention will be described with respect to FIG. 1. In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

Figure 3:
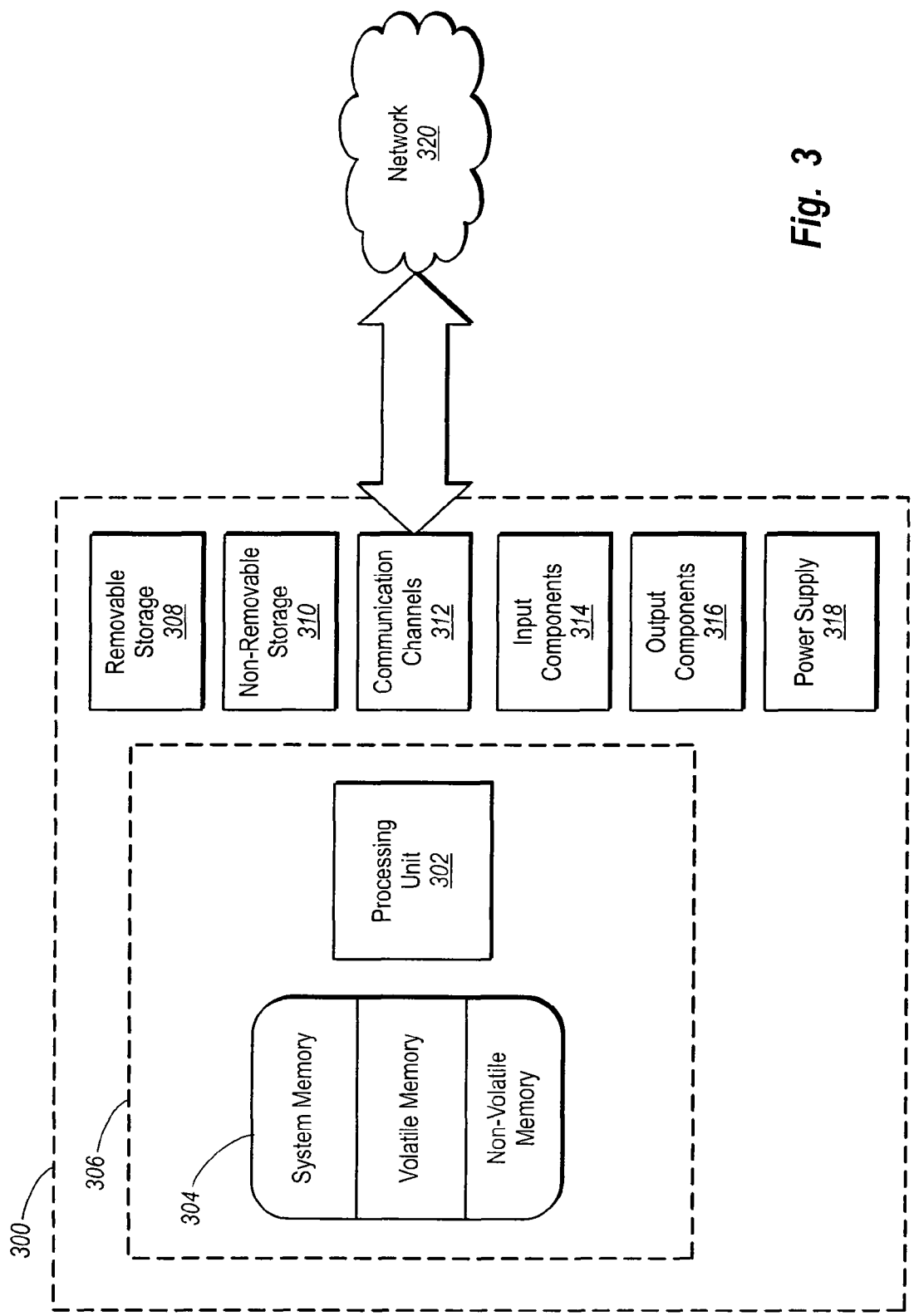
FIG. 3 illustrates an example computing system that provides a suitable operating environment for implementing various features of the present invention.

FIG. 3 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 3.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 300 typically includes at least one processing unit 302 and memory 304. The memory 304 may be volatile (such as RAM), non-volatile (such as ROM, flash memory, etc.), or some combination of the two. This most basic configuration is illustrated in FIG. 3 by the dashed line 306. In this description and in the claims, a "computing system" is defined as any hardware component or combination of hardware components capable of executing software, firmware or microcode to perform a function. The computing system may even be distributed to accomplish a distributed function.

The storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 308 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 310 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated. In this description, a "computing entity" may be any computing system as previously defined herein, or any module or combination of modulates running on a computing system.

Computing system 300 may also contain communication channels 312 that allow the host to communicate with other systems and devices over, for example, network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 300 may also have input components 314 such as a keyboard, mouse, pen, a voice-input component, a touch-input device, and so forth. Output components 316 include screen displays, speakers, printer, etc., and rendering modules (often called "adapters") for driving them. The computing system 300 has a power supply 318. All these components are well known in the art and need not be discussed at length here.

FIG. 1 illustrates an example distributed system that provides a variable identity pipe or communication channel in accordance with exemplary embodiments. The distributed system 100 may be similar to the computing system 300 described above with respect to FIG. 3, although that need not be the case. As shown in FIG. 1, there is a multitude of client/users 105, 106, 107, 108 that are capable of connecting to a front-end service or server 115. Note that the clients 105, 106, 107, 108 may be any type of machine or device within a network or enterprise, or could be outside the enterprise over the Internet.

Clients 105, 106, 107, 108 will issue requests 110 against the system service (e.g., an email system, on line account, etc.) for the front-end server 115 over a given protocol. For example, the clients 105, 106, 107, 108 may be an Internet browser issuing POP/IMAP request. Note, however, that the present invention is not limited to any specific type of service or protocol for communicating with the service provided by the front-end server 115 and back-end server 160. In fact exemplary embodiments will be applicable to any type of topology or distributed system 100 where request for action on resources provided by a back-end server 160 are received from a multitude of clients 105 via an intermediary server such as front-end service 115. As such, any reference made herein to specific service and/or protocols for such services are used for illustrative purposes only and are not meant to limit or otherwise narrow the scope of the present invention unless explicitly claimed.

As alluded to above, clients 105, 106, 107, 108 will make requests 110 for actions on resources that reside on back-end server 160 over a supported protocol (e.g., POP/IMAP). These requests 110 can be for anyone of numerous well known actions that can be taken on resources for a user's account. For example, the actions may be one or more of moving, deleting, copying, reading, creating, modifying, or any other action that can be performed on any one of numerous resources such as a message, folder, process, or the like. Note, however, that the present invention is also available for performing other actions on other resources that are not specifically described herein. Accordingly, any specific reference to any specific action and/or resource is used herein for illustrative purposes and is not meant to limit or otherwise narrow the scope of the present invention unless explicitly claimed.

In order to authenticate the clients 105, 106, 107, 108 to the front-end service 115, the request 110 will also have associated with it a token 112 or other similar credential that is typically non-delegable by default. Note that although a token 112 is used as the credential, as previously mentioned any other non-delegable, or potential even delegable, credentials may be utilized in the present invention. Accordingly, any specific reference to a particular type of credential used to authenticate clients 105, 106, 107, 108 to the front-end service 115 is used herein for illustrative purposes only and is not meant to limit or otherwise narrow the scope of the present invention unless explicitly claimed.

Upon receiving the request 110 and using the token 112 to authenticate a client 105, 106, 107, 108 (e.g., client 105), front-end service 115 may determine the appropriate back-end server 160 to send the request 110. At such time, or typically before hand, the front-end service 115 can make a request 140 to establish the variable identity pipe 145 to the back-end server 160. Having an established relationship with the front-end service 115, back-end server 160 can authenticate the front-end service 115 and establish the variable identity pipe 145. The identity 172 for the front-end server 115 is initially associated to the variable identity pipe 145 during its creation.

Before the front-end server 115 can send requests 110 using the variable identity pipe 145, however, the front-end service 155 will typically need to perform a couple of actions. First, because the token 112 is typically non-delegable, the front-end service 115 will need to extrapolate information that it can pass back to the back-end server 160 for delegating credentials. Accordingly, client identity extraction module 120 uses information within the token 112 to identify groups 132 as well as other client identity info 130 that can be utilized by the back-end server 160 to build an identifier or credential for the client 105.

Second, because the request 110 will typically not include instructions understandable by the back-end 160, the front-end service 115 or remote procedure call processor 125 translates request 110 for actions on resources into one or more remote procedure call (RPC) requests 135. Each RPC request 135 will specify a resource (e.g., a specific folder) and an action 139 (e.g., delete) that can be understood and processed at the back-end server 160. Note that although the request 110 for actions on resources was transformed into RPC requests 135, in the event that the request 110 already includes such calls 135, no transformation may be needed.

This client identity info 130 and RPC requests 135 can then be compiled into a request to change pipe identity 150. This request 150 is then sent across the variable identity pipe 145 to the back-end server 160. Recognizing the request 150 as originating from the front-end service 115, the back-end server 160 accepts the identity change and extrapolates the client identity info 130 and the RPC requests 135.

At this point, the back-end server 160 will typically use an identity builder 165 to take the client identity information 130 and create a new authorization identity (AuthID) 170. This AuthID 170 is then associated with the variable pipe identity 145, thus changing the current ID 172 associated with the variable identity pipe 145 to the clients AuthID 170. Further, as described in greater detail below, this AuthID 170 can be used to authorize the request 110 for actions on resources.

More specifically, the identity builder 165 can extract the group membership info 132 from the client identity info 130. Based upon the group membership info 132, the identity builder 165 builds an AuthID 170 and changes the current identity 172 associated with the variable identity pipe 145 in order to identify the RPC requests 135 as originating from a particular client 105, 106, 107, 108 (e.g., client 105). Note that although the group info 132 from the client identity info 130 is used to create the identity, any other well known way to build an identity 170 is available to the present invention. Accordingly, the use of the group membership info 132 to build AuthIDs 170 is used herein for illustrative purposes only and is not meant to limit or otherwise narrow the scope of the present invention unless explicitly claimed.

In any event, once the AuthID 170 is created authorization access check module 175 uses the AuthID 170 and the RPC request 135 to authorize the actions desired on the resources 190. More specifically, the authorization access check module 175 accesses store 185, which includes the resources 190. Typically associated with each resource is a security description 195 that includes a list of groups and/or users and rights granted or denied for each group and/or user. As such, the authorization access check module 175 compares this information against the AuthID 170 and the RPC requests 135. If RPC requests 135 are authorized for the particular AuthID 170, the RPC requests 135 will be processed. On the other hand, if authorization is not allowed, then the RPC requests 135 will not be processed. In any event, a response to the RPC requests 155 will typically be sent back to the front-end service 115, which then forwards the response 155 to the appropriate client 105, 106, 107, 108 (e.g., client 105).

As new clients or different clients 105, 106, 107, 108 make further requests 110 the above describe process is continually repeated to change the identity 172 associated with the variable identity pipe 145 as necessary. Note, however, that the variable identity pipe 145 remains open between the front-end service 115 and the back-end server 160. Accordingly, connections to the back-end server 160 are substantially reduced, thus increasing scalability and performance of the overall system 100. In addition, the ability to use tokens 112 that are non-delegable by default and extracting the client identity info 130 to create an AuthID 170 provides a constrained delegation mechanism, such that the system or enterprise 100 is not vulnerable to attacks throughout the system. In other words, any type of security risk is limited to the back-end server 160 and not the over all enterprise 110.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIG. 2—is used to indicate the desired specific use of such terms.

Figure 2:
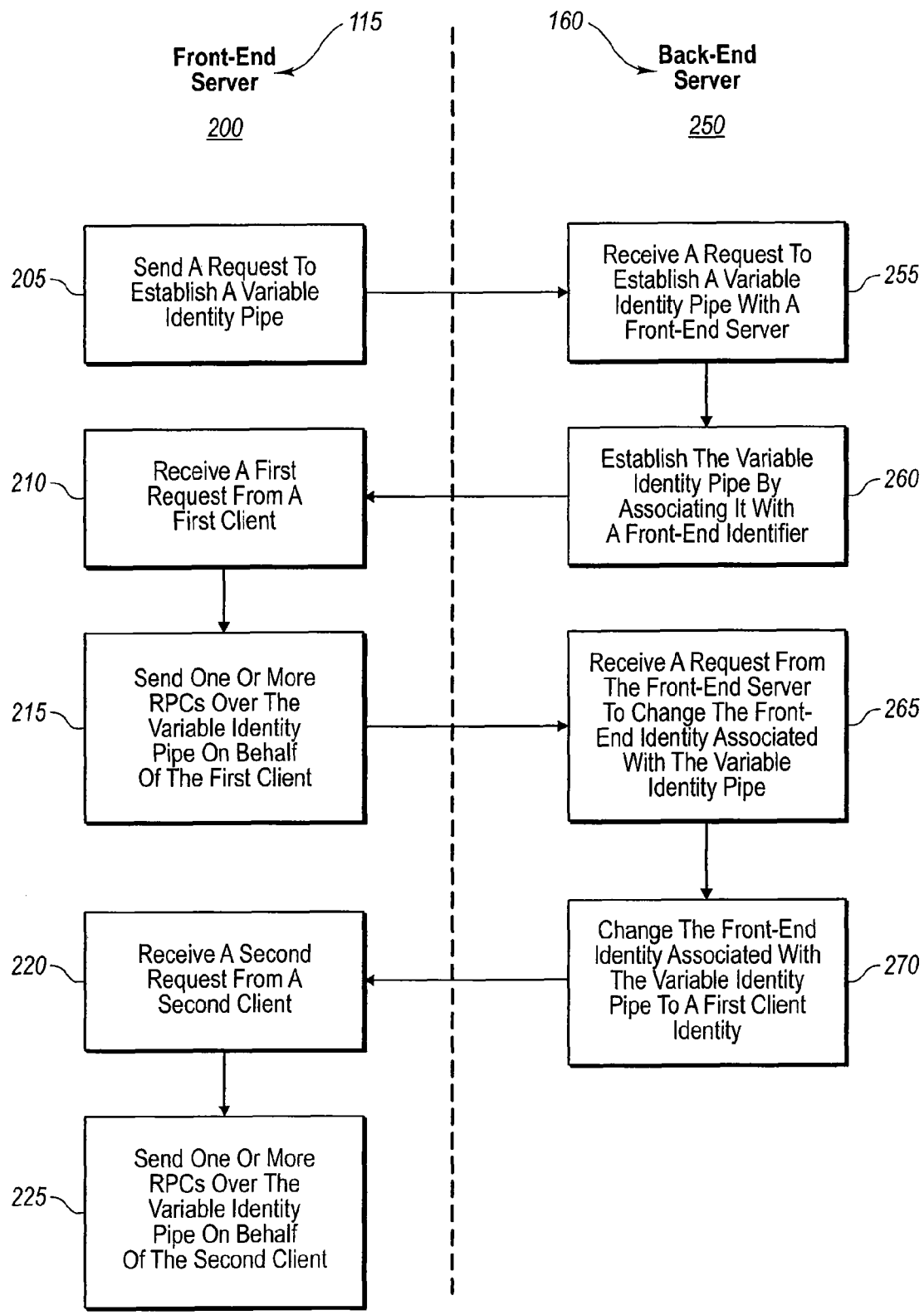
FIG. 2 illustrates a flow diagram for using and changing an identity of variable identity pipe in accordance with example embodiments of the present invention.

FIG. 2 illustrates flow diagrams for various exemplary embodiments of the present invention. The following description of FIG. 2 will occasionally refer to corresponding elements from FIG. 1. Although reference may be made to a specific element from this Figure, such elements are used for illustrative purposes only and are not meant to limit or otherwise narrow the scope of the present invention unless explicitly claimed.

FIG. 2 illustrates a flow diagram for methods preformed on a front-end 115 and a back-end 160 servers. Front-end server 115 performs a method 200 of providing constrained delegation while reducing connections needed for a multitude of clients by using a signal variable identity communication channel between the back-end server 160 and the front end server 115. Back-end server 160 provides a method 250 of pooling connections by changing an identity of an established communication channel.

Method 200 includes an act of sending 205 a request to establish a variable identity pipe. For example, front-end service 115 can send a request 140 to establish variable identity pipe 145 to the back-end server 160. Note that the variable identity pipe 145 will be used in facilitating communications between a multiple clients 105, 106, 107, 108 and back-end server 160. Further, the request 140 to establish a variable identity pipe 145 will typically include information used to authenticate the front-end server 115 to the back-end server 160.

On the back-end server side 160 method 250 includes an act of receiving 225 a request to establish the variable identity pipe with a front-end server. That is, back-end server 160 receives the request 140 to establish the variable identity pipe 145, wherein the request 140 includes the front-end identifier for authenticating the front-end to the back-end 160. Upon authenticating the front-end server, method 250 includes an act of establishing 260 the variable identity pipe by associating it with the front-end identifier. For instance, upon authenticating front-end service 115, back-end server 160 can create variable pipe or identity pipe 145 by associating the front-end server's 115's identity 172 to the communication channel 145. As previously mentioned, this variable identity pipe 145 will be used to facilitate communications between multiple clients 105 and the back-end server 160.

Back on front-end server 115 side, method 200 further includes an act of receiving 210 a first request from a first client. For example, front-end server 115 may receive a request 110 from a first client 105, 106, 107, 108 (e.g., client 105) to take actions on resources on the back-end server 160 corresponding to an account for the first client 105. Method 200 also includes an act of sending 115 one or more Remote Procedure Calls (RPCs) over the variable identity pipe on behalf of the first client. For example, front-end service 115 can receive request 110 from the first client 105 and use the remote procedure call processor 125 to create one or more RPC requests 135, which will be used to invoke one or more actions 139 on one or more resources 137 corresponding to the account for the first client 105.

On the back-end server side 160, method 205 also includes an act of receiving 265 a request from the front-end server to change the front-end identity associated with variable identity pipe. For example, front-end server 115 upon receiving the request 110 from the client 105 can extract user or client information in token 112 by passing it through a client identity extraction module 120 to create client identity info 130. Client identity info 130 will typically have information about one or more groups 132 the user is associated with. This client identity info 130 can then be received by the back-end server 160 and used by identity builder 165 to create an AuthID 170.

Note that although the client info 130 is generated into an identity 170 by the identity builder 165, this might not always be the case. For example, the client identity info 130 may contain sufficient information about the groups 132 and the client to require no processing by identity builder 165. As such, the use of the identity builder 165 to create AuthID 170 is used herein for illustrative purposes only and is not meant to limit or otherwise narrow the scope of the present invention unless explicitly claimed.

In any event, method 250 further includes an act of changing 270 the front-end identity associated with the variable identity pipe to a first client identity. For example, upon receiving request 150 to change the pipe identity, back-end server 160 can use AuthID 170 to associate it with the variable identity pipe 145 in order to change the identity 172 of the communication channel 145. In other words, the front-end 115 identity that is currently associated with the variable identity pipe is changed to the identity of the first client 105. This will allow the first client 105 to make requests via the front-end server 115 to take one or more actions on one or more resources 190 residing on back-end server 160, wherein the actions and resources correspond to an account for the first client 105.

Back on the front-end server 115 method 200 also includes and act of receiving 220 a second request from a second client. For example, after receiving a request 110 from a first client 105 and sending such requests to the back-end server 160, the response 155 to the request 150 may then sent from the front-end service 115 to the first client 105. Thereafter, a second request 110 for action on resources from a second client 106, 107, 108 (e.g., client 106) can be received from the front-end 115, wherein the second request 110 includes information about actions to be taken on resources corresponding to an account for the second client 106. Method 200 then includes an act of sending 225 one or more remote procedure calls over the variable identity pipe on behalf of the second client. That is, upon receiving the request 110 from the second client 106, front-end service 115 can use remote procedure call processor 125 to create RPC requests 135 to invoke one or more actions 139 on one or more resources 137 corresponding to an account for the second client 106.

The above processing of the request 110 from the second client 106 will then be done in a similar manner as that previously described for the first client 105. In other words, the variable identity pipe 145 will change the ID 172 associated with communication channel 145 to an AuthID 170 corresponding to the second client 106. The client identity info 130, RPC request 135, and security descriptions 195 can then be used by authorization access check module 175 to determine if the client 106 is authorized to perform the specific actions 139 on the specific resource 190. Based on the authorization, an appropriate response 155 to the second RPC requests 135 is then forwarded to the second client 106 via the front-end server 115.

We claim:

1. A computer program product comprising one or more computer storage media having encoded thereon computer executable instructions which, when executed in a distributed computing system with a front-end server and a back end server which communicate over a network, perform a method of pooling connections between the front-end server and the back-end server by changing an identity for an established communication channel in order to reduce the number of connections needed to allow multiple clients to take action on multiple resources residing on the back-end server, the method comprising:

a back-end server receiving a request from a front-end server to establish a variable identity pipe with the front-end server, the request including a front-end identifier for authenticating the front-end server to the back-end server, the variable identity pipe to be used to facilitate communication between multiple clients through the front-end server to multiple resources residing on the back-end server;

the back-end server authenticating the front-end server;

establishing the variable identity pipe between the front-end server and the back-end server;

associating the front-end identifier with the variable identity pipe;

receiving a first request from the front-end server to change the identity associated with the variable identity pipe from the front-end server to a first client identity for a first client connected to the front-end server, the request including first client identity information; and changing the identity associated with the variable identity pipe to the first client identity;

receiving from the front-end server one or more remote procedure calls (RPCs) associated with the first client for a first resource on the back-end server.

2. The computer program product of claim 1, further comprising:

receiving a second request from the front-end server to change the identity associated with the variable identity pipe to a second client identity, the request including second client identity information;

changing the identity associated with the variable identity pipe to the second client identity; and receiving from the front-end server one or more remote procedure calls associated with the second client for a second resource on the back-end server.

3. The computer program product of claim 2, wherein the first and second request include one or more remote procedure calls for invoking one or more actions on one or more resources residing on the back-end server that correspond to accounts for the first and second clients.

4. The computer program product of claim 2, wherein the first client identity information and the second client identity information includes information about groups for accounts of the first and second client, and wherein the information about the groups is used to create an identity on the back-end server for the first and second clients used to authorize the one or more actions on the one or more resources corresponding to the accounts for the first and second clients.

5. The computer program product of claim 4, wherein a security description defining allowable groups and allowable or unallowable actions on resources for those groups is used to authorize the one or more actions.

6. The computer program product of claim 4, wherein the first client identity information and the second client identity information is extracted from a first non-delegable credential that is used to authenticate the first client to the front-end server and a second non-delegable credential that is used to authenticate the second client to the front-end server.

7. The computer program product of claim 2, further comprising sending a first response and a second response to the front-end server, the first response being responsive to the one or more remote procedure calls associated with the first client for the first resource and the second response being responsive to the one or more remote procedure calls associated with the second client for the second resource.

* * * * *